US009593759B2

(12) United States Patent
Millard et al.

(10) Patent No.: US 9,593,759 B2
(45) Date of Patent: Mar. 14, 2017

(54) ADJUSTABLE FLYWEIGHT PIVOT SHAFT FOR A CVT

(71) Applicant: THE GATES CORPORATION, Denver, CO (US)

(72) Inventors: Fred Millard, Oxford, MI (US); Chris McClellan, Windsor (CA); Gerard Karpik, Eveleth, MN (US); Oliver Stegelmann, Strathroy (CA)

(73) Assignee: GATES CORPORATION, Denver, CO (US)

( * ) Notice: Subject to any disclaimer, the term of this patent is extended or adjusted under 35 U.S.C. 154(b) by 140 days.

(21) Appl. No.: 14/559,021

(22) Filed: Dec. 3, 2014

(65) Prior Publication Data
US 2016/0160989 A1 Jun. 9, 2016

(51) Int. Cl.
F16H 55/56 (2006.01)
F16H 61/662 (2006.01)

(52) U.S. Cl.
CPC ..... F16H 55/563 (2013.01); F16H 61/66245 (2013.01)

(58) Field of Classification Search
CPC ............. F16H 55/563; F16H 61/66245; F16H 61/66268; F16H 61/66272; F16D 43/06
See application file for complete search history.

(56) References Cited

U.S. PATENT DOCUMENTS

| 5,326,330 | A | 7/1994 | Bostelmann | |
|---|---|---|---|---|
| 6,309,317 | B1 | 10/2001 | Joss | |
| 6,346,056 | B1 | 2/2002 | Nouis et al. | |
| 7,276,004 | B2 | 10/2007 | Wu et al. | |
| 9,267,580 | B2* | 2/2016 | Aitcin | F16H 9/125 |
| 2008/0080952 | A1 | 4/2008 | Cook | |
| 2012/0214626 | A1* | 8/2012 | Cook | F16H 61/66245 474/14 |
| 2014/0349792 | A1* | 11/2014 | Aitcin | F16H 9/125 474/13 |

FOREIGN PATENT DOCUMENTS

WO 2013032463 A2 3/2013

OTHER PUBLICATIONS

European Patent Office, International Search Report Application No. PCT/US2015/060888, mailing date Jan. 22, 2016.

* cited by examiner

Primary Examiner — William E Dondero
Assistant Examiner — Robert T Reese
(74) Attorney, Agent, or Firm — Jeffrey A. Thurnau, Esq.; Paul N. Dunlap, Esq.

(57) ABSTRACT

An adjustable flyweight pivot shaft assembly for a CVT comprising a pivot shaft, a flyweight engaged with a pivot shaft surface, an eccentric collar having a bore with an eccentric center axis, the pivot shaft engaged with the eccentric collar bore, the eccentric collar having an indexing portion, the indexing portion engagable with the receiving portion on the CVT body, the indexing portion engaging the receiving portion to lock the eccentric collar and thereby pivot shaft in a desired position with respect to the axis of rotation of the CVT.

4 Claims, 5 Drawing Sheets

ADJUSTABLE FLYWEIGHT PIVOT SHAFT FOR A CVT

FIELD OF THE INVENTION

The invention relates to an adjustable flyweight pivot shaft, and more particularly, to an adjustable flyweight pivot shaft having an eccentric collar having an indexing portion, the indexing portion engagable with the receiving portion on the CVT body, the indexing portion engaging the receiving portion to lock the eccentric collar and thereby pivot shaft in a desired position with respect to the axis of rotation of the CVT.

BACKGROUND OF THE INVENTION

High performance engines require quick response times. The drive transmissions must shift speeds quickly to provide optimum performance. This is particularly true in racing situations, for example in snowmobile racing.

The infinitely variable drive pulley for belt drive transmissions commonly found in snowmobile engines is well known. A key part of the clutch system in those transmissions is the actuator lever or shifter which operates as a cam relative to a fixed roller by pivoting about a pivot point on an axially moveable sheave so that in response to centrifugal force the axially moveable sheave of the system is urged towards an axially fixed sheave.

Pulleys of this type typically comprise opposed frusto-conical flanges which co-operate with a drive belt. The cone pulley is secured axially on the shaft and the other can be moved axially against the force of a return spring, by centrifugal weights in the form of adjusting levers that act on an adjusting stop through a cam surface and which are each supported so as to be able to pivot outwards about a pin that extends transversely to the shaft and is spaced radially therefrom.

The size of the V-gap between the two pulley flanges of such drive transmissions is a function of the particular rotational speed. It is known that levers acting as centrifugal weights can be associated with the axially adjustable pulley flange, these levers being supported on rollers associated with the fixed flange, so that when the adjusting levers pivot outwards as a result of centrifugal force the axially moveable flange is pressed towards the fixed flange. The axial adjustment path of the pulley thus depends on the angle to which the adjusting levers are pivoted, which in turn is determined by centrifugal forces and by the shape of the rolling track for the rollers on the adjusting levers.

Thus, for a given course of the return force, a desired inter relationship of the axial movement of the movable flange and the rotational speed can be achieved by the shape of the rolling track of the adjusting lever (which forms a cam surface) and by the mass of the centrifugal weight formed by the adjusting lever, and the position of the centre of gravity of such mass. However, a given relationship between the axial movement of the moveable flange and the rotational speed can only be maintained if the position of the cam surface of the adjusting lever and the mass of the centrifugal weights and the position of the centre of gravity of such weights can be kept within close tolerances. It is extremely difficult to guarantee this in components made by production, and requires subsequent adjustment work.

It is known that to adjust the weighted levers, the position of each lever or of the roller that is associated with it as an adjustable abutment can be moved. However, such a step provides a corresponding matching potential and adjustment only in the range of small adjustment paths but not, however, in the range of larger adjustment paths, for which a match would be of considerably greater importance.

Representative of the art is U.S. Pat. No. 5,326,330 which discloses an infinitely variable drive pulley for a belt drive transmission with two flanges arranged on a shaft and which accommodate a V-belt. One flange is fixed axially on the shaft and the other is moveable in the axial direction against the force of at least one return spring by centrifugal weights in the form of adjusting levers. The adjusting levers each acts on an abutment cam surface, and is supported so as to be able to pivot out about a pin that extends transversely to the shaft, spaced radially therefrom. The adjusting levers can be moved relative to their pivot pins through an adjustment eccentric.

What is needed is a CVT having an eccentric collar having an indexing portion, the indexing portion engagable with the receiving portion on the CVT body, the indexing portion engaging the receiving portion to lock the eccentric collar and thereby pivot shaft in a desired position with respect to the axis of rotation of the CVT. The present invention meets this need.

SUMMARY OF THE INVENTION

The primary aspect of the invention is to provide a CVT having an eccentric collar having an indexing portion, the indexing portion engagable with the receiving portion on the CVT body, the indexing portion engaging the receiving portion to lock the eccentric collar and thereby pivot shaft in a desired position with respect to the axis of rotation of the CVT.

Other aspects of the invention will be pointed out or made obvious by the following description of the invention and the accompanying drawings.

The invention comprises an adjustable flyweight pivot shaft assembly for a CVT comprising a pivot shaft, a flyweight engaged with a pivot shaft surface, an eccentric collar having a bore with an eccentric center axis, the pivot shaft engaged with the eccentric collar bore, the eccentric collar having an indexing portion, the indexing portion engagable with the receiving portion on the CVT body, the indexing portion engaging the receiving portion to lock the eccentric collar and thereby pivot shaft in a desired position with respect to the axis of rotation of the CVT.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
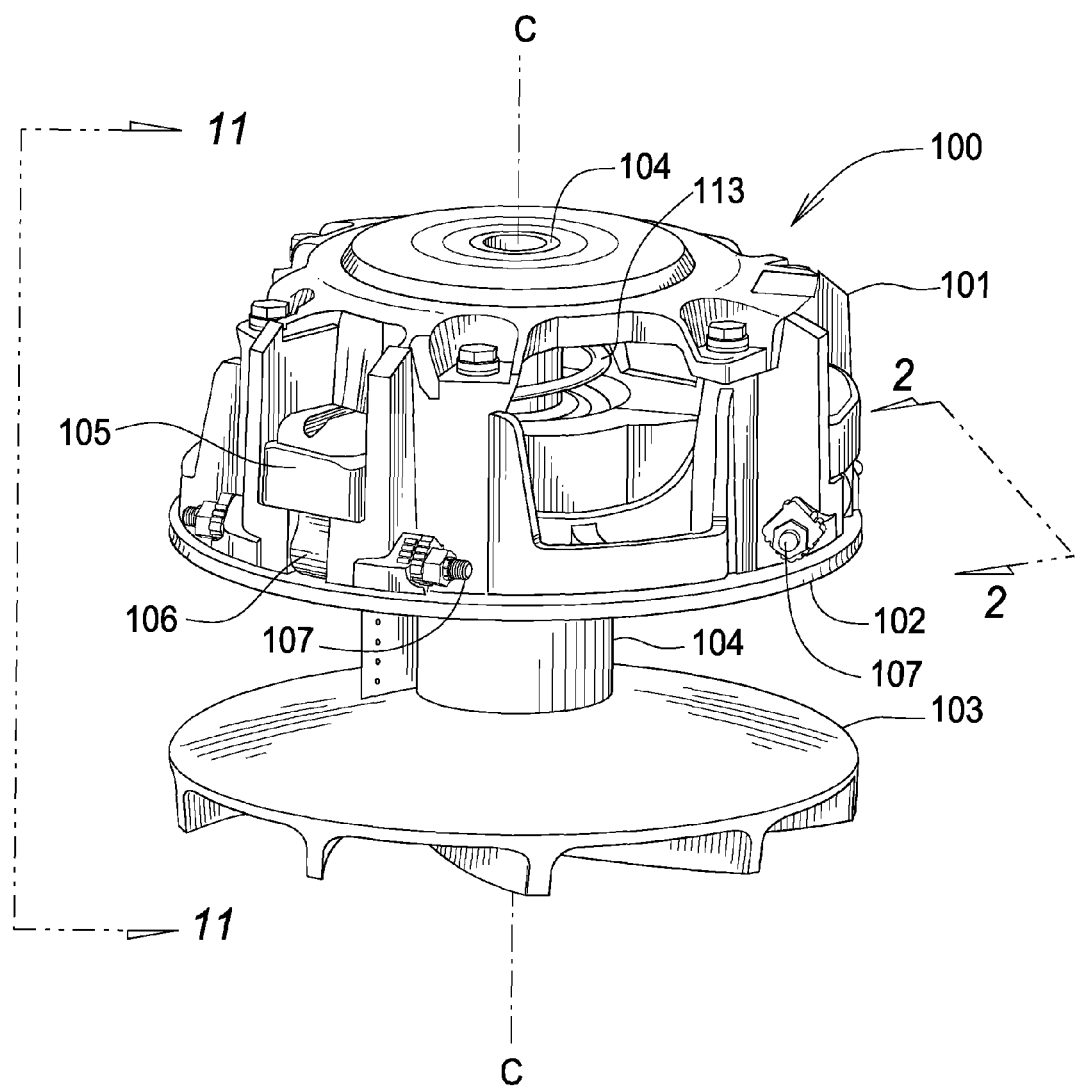
FIG. 1 is a perspective view of a CVT clutch.

FIG. 1 is a perspective view of a continuously variable transmission (CVT) clutch. CVT transmission 100 comprises a body 101. Fixed sheave 103 is attached to shaft 104. Shaft 104 is typically connected to a motor crankshaft (not shown). Moveable sheave 102 is attached to body 101. Spider 105 is attached to shaft 104. Spring 113 urges body 101 away from spider 105, thereby forcing the fixed sheave and moveable sheave apart.

A plurality of flyweights 106 bear upon spider 105. As the rotational speed increases the flyweights move radially outward, thereby urging against pivot 114 of spider 105, see FIG. 11, and compressing the spring. This movement causes moveable sheave 102 to move toward fixed sheave 103, thereby increasing the engagement radius of a CVT belt (not shown) between the sheaves. Flyweight 106 pivots on a pivot shaft 107. The embodiment described herein comprises three flyweights although more may be used as required by a user.

Figure 2:
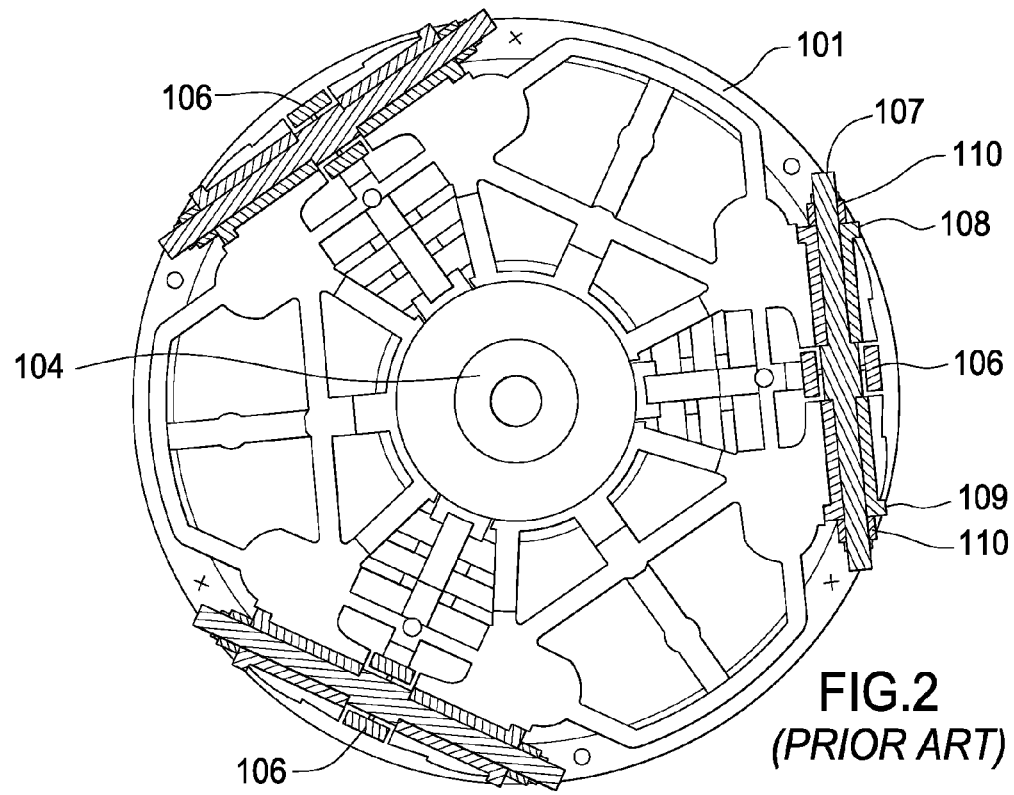
FIG. 2 is a cross sectional view of FIG. 1 showing a prior art flyweight pivot shaft arrangement.

FIG. 2 is a cross sectional view of FIG. 1 showing a prior art flyweight pivot shaft arrangement. The cross-sectional view cuts through the pivot shafts. Collar 108 and collar 109 engage CVT body 101. Pivot shaft 107 engages collar 108 and 109. Flyweight 106 pivots on a pivot shaft surface 111, see FIG. 5.

Figure 3:
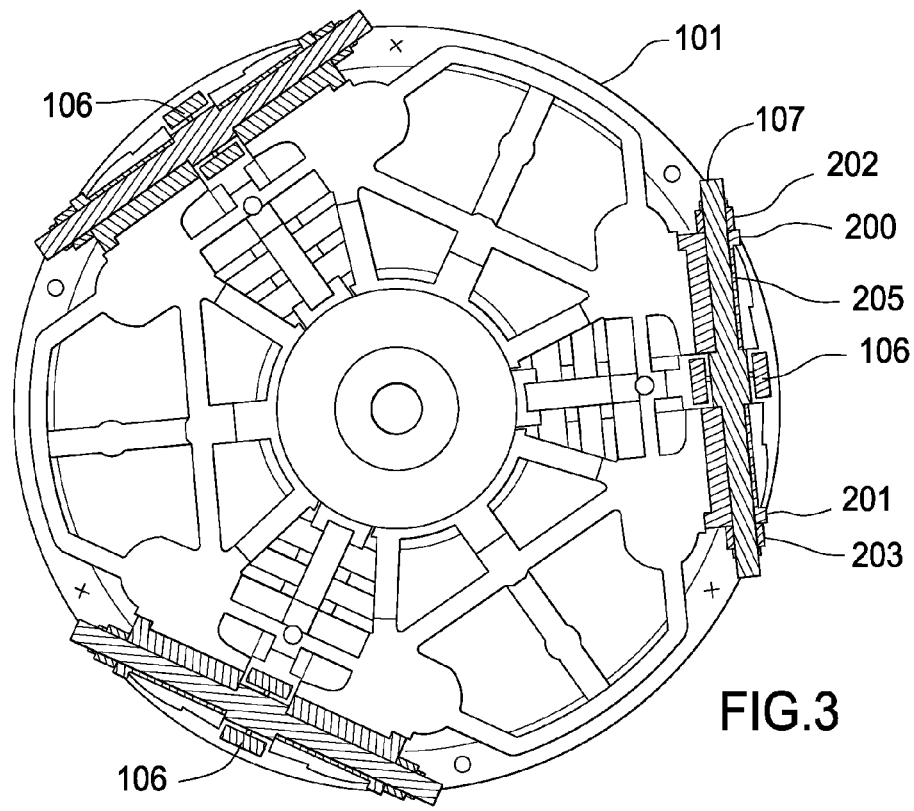
FIG. 3 is cross-sectional view FIG. 2 showing the inventive flyweight pivot shaft arrangement.

FIG. 3 is cross-sectional view FIG. 2 showing the inventive flyweight pivot shaft arrangement. The inventive pivot shaft comprises eccentric collar 200 and eccentric collar 201. A nut 202 retains collar 200. A nut 203 retains collar 201. Flyweight 106 pivots on a pivot shaft surface 111. Collars 200 and 201 are slip fit into receiving portion 208 and 209 respectively.

Figure 4:
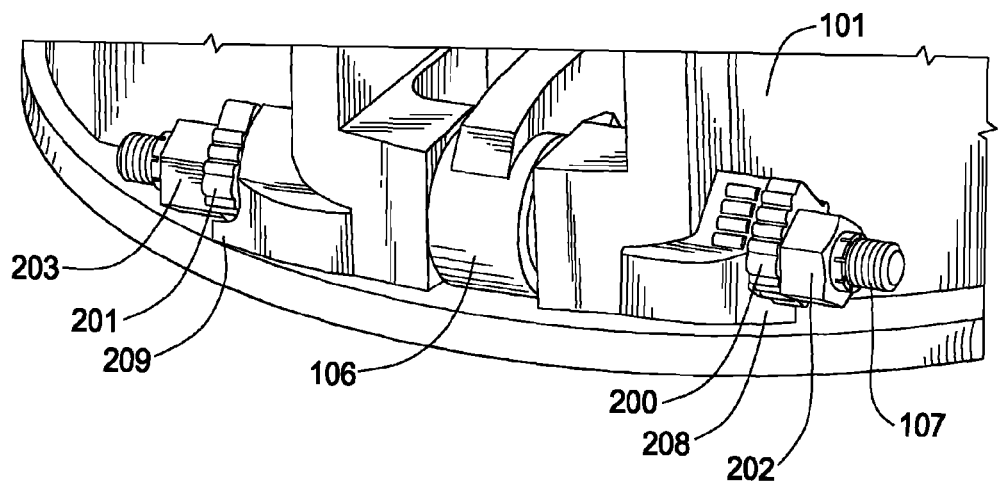
FIG. 4 is a detail of FIG. 1.

FIG. 4 is a detail of FIG. 1. Pivot shaft 107 is retained in body 101 between eccentric collar 200 and 201. Nut 202 and nut 203 are threaded on pivot shaft 107 to retain the collars 200 and 201 there between.

Figure 5:
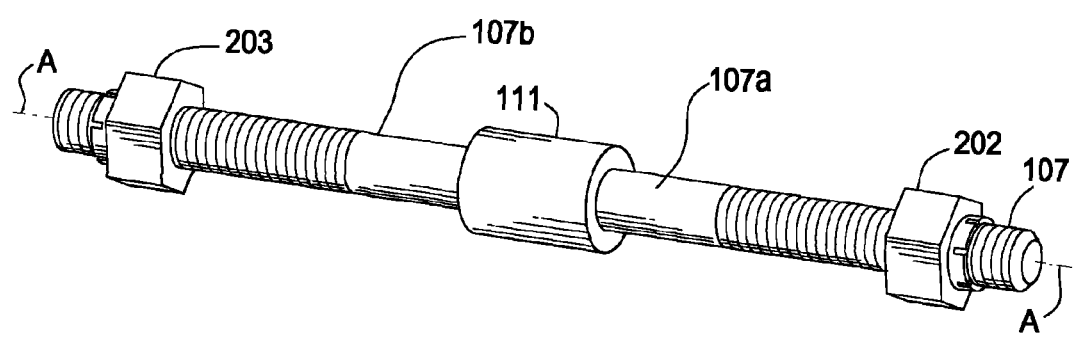
FIG. 5 is a detail of the pivot shaft.

FIG. 5 is a detail of the pivot shaft. Pivot shaft surface 111 is concentric about the pivot shaft axis A-A. Pivot shaft 107 comprises threaded portion 107a and threaded portion 107b. Portion 107a and portion 107b are coaxial and are axially aligned with surface portion 111.

Figure 6:
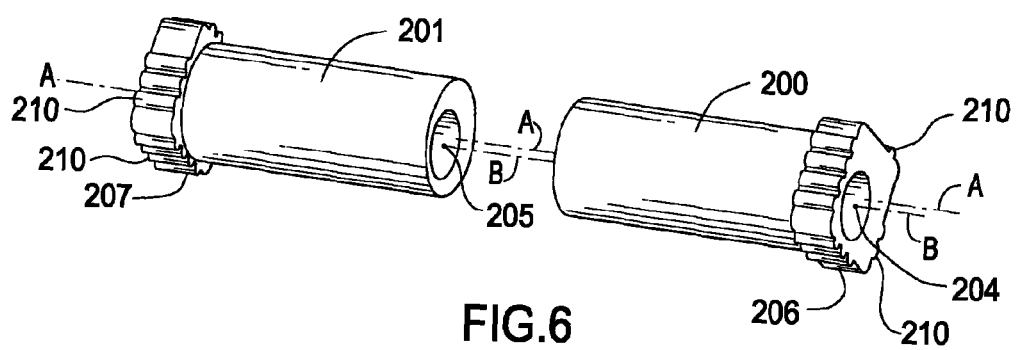
FIG. 6 is a detail of the pivot shaft eccentric collars.

FIG. 6 is a detail of the pivot shaft eccentric collars. Eccentric collar 200 comprises a bore 204 having an axis B-B. Bore axis B-B is offset from a centerline axis A-A of collar 200. Axis A-A is the same as axis A-A as described in FIG. 5 for pivot shaft 107. The amount of offset of axis B-B from axis A-A may be changed for each different set of eccentric collars, thereby expanding the adjustable range.

Collar 200 comprises an indexing portion 206. Collar 201 comprises an indexing portion 207. Indexing portion 206 engages a receiving portion 208 in body 101. Indexing portion 207 engages a receiving portion 209 in body 101.

The rectangular shape of indexing portion 206 and 207 mates with the rectangular shape of the receiving portion 208 and 209. The cooperating rectangular shapes will lock each indexing portion and thereby collar in one of four desired positions. Each of the four desired positions correspond to a radial position of the pivot shaft due to the eccentric position of the pivot shaft in each collar.

For ease of use, indexing marks 210 indicate the setting of each collar and thereby a pivot shaft radial position with respect to the axis of rotation of the CVT, see C-C in FIG. 1. Each set of indexing marks is raised slightly so a user can determine a collar position by tactile position detection without need for visual confirmation.

Figure 7:
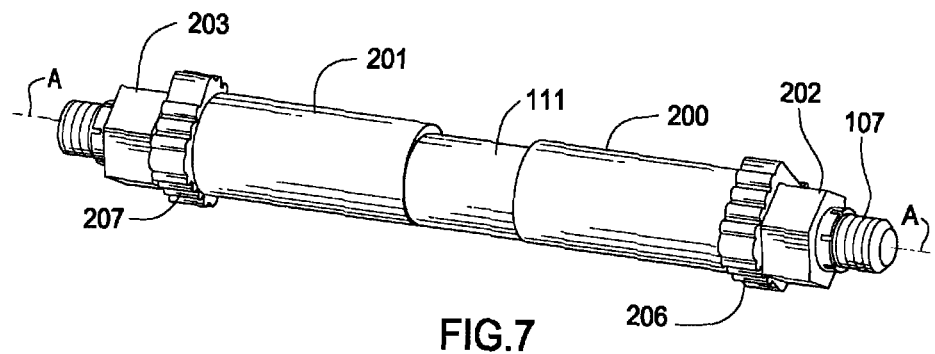
FIG. 7 is a detail of the assembled pivot shaft with eccentric collars.

FIG. 7 is a detail of the assembled pivot shaft with eccentric collars.

Figure 8:
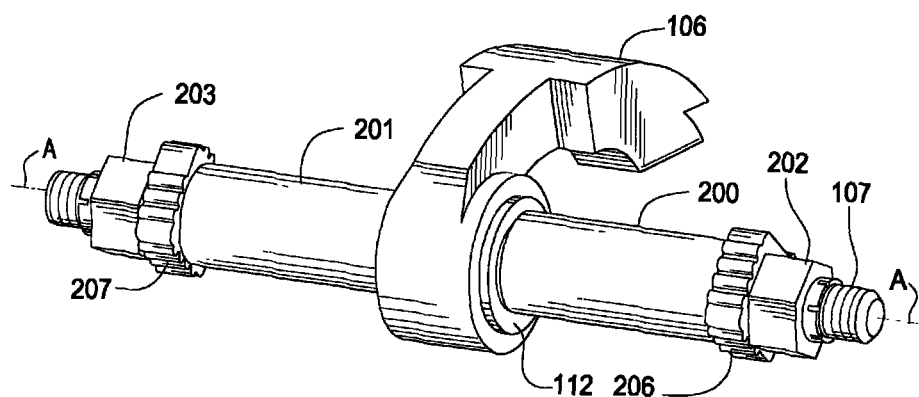
FIG. 8 is a detail of the assembled pivot shaft with eccentric collars and flyweight.

FIG. 8 is a detail of the assembled pivot shaft with eccentric collars and flyweight. Bush 112 is disposed between flyweight 106 and surface 111.

Figure 9:
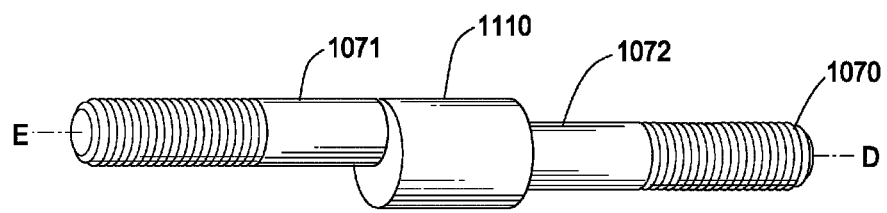
FIG. 9 is an alternate embodiment of the invention.

FIG. 9 is an alternate embodiment of the invention. Pivot shaft 1070 has a first threaded portion 1071 having an axis E which is axially offset from, and thereby not coaxial with the axis D of the second threaded portion 1072. Surface 1110 is disposed between portion 1071 and 1072, see FIG. 10.

Figure 10:
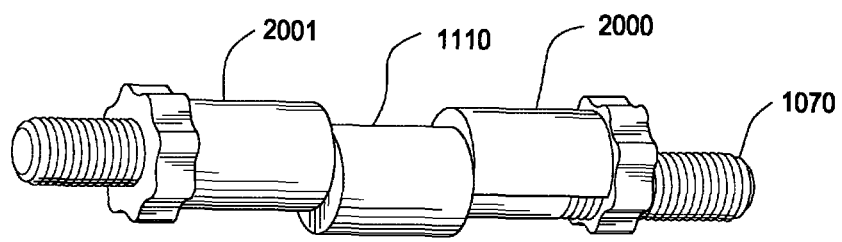
FIG. 10 is a detail of the alternate embodiment of the invention in FIG. 9.

FIG. 10 is a detail of the alternate embodiment of the invention in FIG. 9. Eccentric collar 2000 is identical to eccentric collar 200. Collar 2001 is not eccentric. Collar 2000 is cooperatively disposed with collar 2001. Collar 2001 engages portion 1071. Eccentric collar engages portion 1072.

Figure 11:
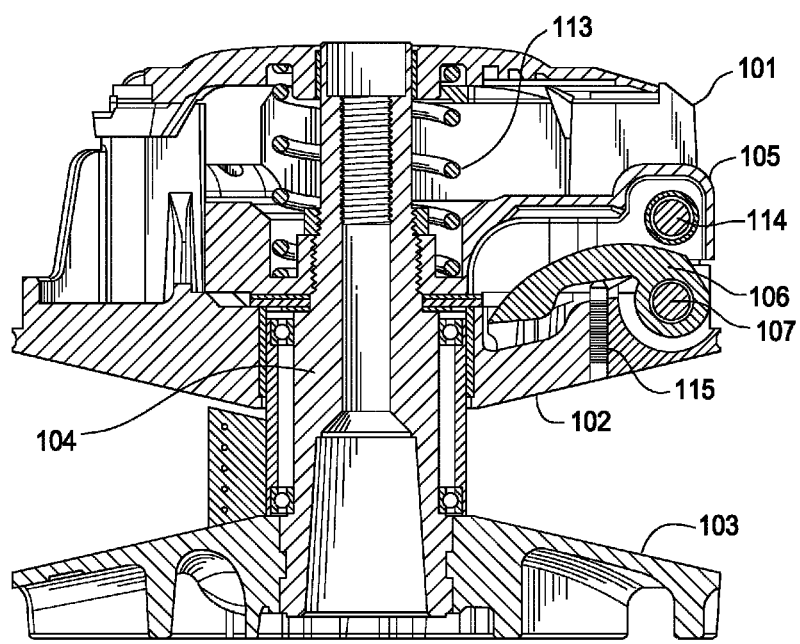
FIG. 11 is a cross sectional view of FIG. 1.

FIG. 11 is a cross sectional view of FIG. 1. Flyweight 106 bears against pivot 114 in spider 105 as speed increases. Screw 115 establishes the maximum distance between the sheaves by placing flyweight 106 in initial contact with pivot 114. Screw 115 is used to displace flyweight 106 toward or away from pivot 114, which in turn moves sheave 102 toward or away from sheave 103. Movement of pivot shaft 107 and thereby of flyweight 106 will change the dynamic behavior of the clutch.

The invention comprises an offset convertible pivot. The invention allows use of the same flyweights as originally provided by the factory. This converts the factory provided clutch to a tuner clutch. The tuner can adjust the action of the flyweights as desired by adjusting the position of the flyweight pivot shaft. Conversion from factory setting to tuner setting is possible without removing the clutch from the vehicle and without removing the flyweights or the flyweight pivots from the clutch.

In tuner setting, adjustment of the flyweight position is possible without removing any components from the clutch at all. Adjustment can be accomplished by loosening the pivot shaft nuts 202, 203, re-indexing the eccentric collars, and re-tightening the nuts. As each eccentric collar is rotated in the receiving portion of the housing or moveable sheave, the flyweight pivot shaft 107 center moves as the collar is rotated.

Exemplary mode of operation: Engine tuner mode using the eccentric collars 200, 201. For installation, the flyweights 106 are held in sheave 102. Pivot shaft 107 is then installed. Eccentric collars 200, 201 are installed over each end of the pivot shaft and into the receiving portions 208, 209 with a slip fit for easy adjustment. Ensure that both collars are installed in the same direction by reference to marks 210. Tighten the nuts 202, 203. Repeat for all flyweights.

For adjustment, using the eccentric collars, there are up to four positions that the flyweight pivot shaft can be tuned to, namely, outboard, high, inboard, low. These positions correspond to changes in the radial position of pivot shaft 107 with respect to axis C-C (outboard, inboard), or to axial position of pivot shaft 107 parallel to axis C-C (high, low), or a combination of the two. One can appreciate that the number of potential radial and axial positions are infinite depending on the chosen shape of the eccentric collar indexing portions 206, 207.

To adjust, loosen both nuts 202, 203 on a given pivot shaft 107 just far enough to unseat the collars 200, 201. Pull both collars out far enough to unseat them. Rotate both collars in the same direction to the desired tune position; refer to marks 201 for final position. Reseat the collars and tighten the nuts. Repeat for the remaining pivot shafts.

Although a form of the invention has been described herein, it will be obvious to those skilled in the art that variations may be made in the construction and relation of parts without departing from the spirit and scope of the invention described herein.

We claim:

1. An adjustable flyweight pivot shaft assembly for a CVT comprising:
    a pivot shaft (107), the pivot shaft comprises a first portion that is not coaxial with a second portion;
    a flyweight (106) engaged with a pivot shaft surface (111);
    an eccentric collar (200) having a bore (205) with an eccentric center axis (B-B), the pivot shaft engaged with the eccentric collar bore; and
    the eccentric collar at one end of the pivot shaft having an indexing portion (206), the indexing portion engagable with the receiving portion (208) on the CVT body, the indexing portion engaging the receiving portion to lock the eccentric collar and thereby pivot shaft in a desired position with respect to the axis of rotation (C-C) of the CVT.

2. The assembly as in claim 1 further comprising a second eccentric collar cooperatively disposed with the eccentric collar.

3. The assembly as in claim 1, wherein the first portion and the second portion are threaded.

4. The assembly as in claim 1, wherein the indexing portion further comprises a raised indexing mark for tactile position detection.

* * * * *